Figure 1:
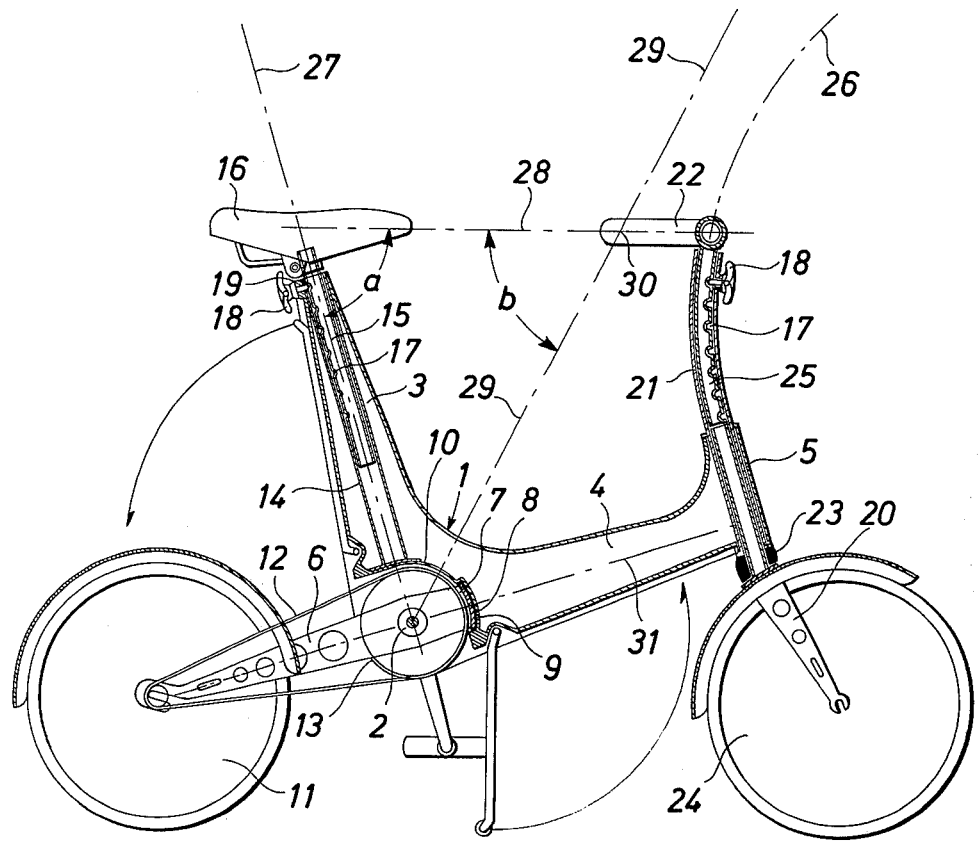

United States Patent [19]

Gammelgaard

[11] 3,933,373

[45] Jan. 20, 1976

[54] BICYCLE HAVING ARCHED MOUNTING TUBE FOR THE STEERING MEMBER

[76] Inventor: Niels Gammelgaard, Frederiksholms Kanal 18 A, 1220 Copenhagen K., Denmark

[22] Filed: Apr. 10, 1974

[21] Appl. No.: 459,792

[30] Foreign Application Priority Data

Apr. 10, 1973 Denmark.............................. 1950/73

[52] U.S. Cl. ............... 280/278; 74/551.3; 280/281; 280/287
[51] Int. Cl.² ......................................... B62K 21/22
[58] Field of Search ........... 280/270, 274, 278, 279, 280/281, 287; 74/551.1, 551.3

[56] References Cited
UNITED STATES PATENTS

| 415,740 | 11/1889 | Sharp | 280/278 |

FOREIGN PATENTS OR APPLICATIONS

| 187,321 | 11/1887 | France | 280/281 |

Primary Examiner—M. Henson Wood, Jr.
Assistant Examiner—Terrance L. Siemens
Attorney, Agent, or Firm—Cushman, Darby & Cushman

[57] ABSTRACT

A bicycle having a steering member (handlebars) which is mounted in a tube connected to the tubular mounting member for the front fork, said tube being arched in such a way that the arch centre is positioned in front of the bicycle, the mounting tube of the steering member being arched in the same manner and slidably mounted therein, tightening means being provided to fix the mounting tube of the steering member at a desired height, the frame being shaped in such a way that a substantially horizontal line through the saddle and the handlebars, a straight line from the crank through the mounting tube for the saddle, and a straight line from the crank to the handlebars constitute a triangle in which the angle at the saddle will be about 73° and the angle at the handlebars about 62°, whereby an optimal comfort for the driver is obtained.

3 Claims, 2 Drawing Figures

BICYCLE HAVING ARCHED MOUNTING TUBE FOR THE STEERING MEMBER

This invention relates to a bicycle of the type which has a frame portion extending obliquely from the crank and carrying a tube in which the saddle mounting tube is adjustably mounted by means of tensioning means, so that the saddle can be fixed at a desirable height, the frame further having an oblique front fork tube in which a mounting tube for the tube of the steering member is adjustably mounted.

The frames for bicycles of the known constructions have a tube member in which the saddle tube is adjustably mounted and a mounting tube for the front fork which is substantially parallel to the said tube, so that the saddle tube and the steering member tube are straight, and when adjusting the height of the saddle and the handlebars the distance between the saddle and the handlebars will be substantially the same at all levels of the saddle and the handlebars. As tall persons who must have the saddle and the handlebars mounted at a high level have generally long arms and a long torso the comfortable driving position for small persons will be different than for tall persons, and the bicycle should, accordingly, be constructed in such a way that at a certain high position of the saddle and the handlebars it gives optimal driving comfort for a person of a corresponding height, whereas the comfort will decrease at higher and lower levels of the saddle and the handlebars.

In order to obtain a comfortable driving position for persons of varying heights the horizontal distance between the saddle and the handlebars must increase by increasing height. In order to fulfil this requirement handlebars have been proposed which can rotate in their mounting tube about a horizontal axis and be fixed in different positions, but such an adjustment results in oblique positions of the handles, which is not comfortable, and further the steering member must have a rather complicated construction. The rotatable connection between the handlebars and the substantially vertical tube involves a risk of unintentional rotation of the handlebars.

The bicycle according to this invention is characterized in that the mounting tube for the steering member extends upwardly from the frame portion receiving the front fork tube and is arched in such a way that the centre is positioned in front of the frame when the front wheel is in position for straight ahead driving, the tube of the handlebars being arched in the same way and slidably mounted in the mounting tube, tensioning means being provided adapted to fix the two arched tube members in relation to each other.

By this construction an adjustment of the handlebars to a higher position will have the effect that the handles are moved away from the saddle, so that the distance from the saddle to the handles will increase at increased height of the handlebars. Thereby the same driving comfort can be obtained by a high level of the handlebars as at a low level.

Figure 2:
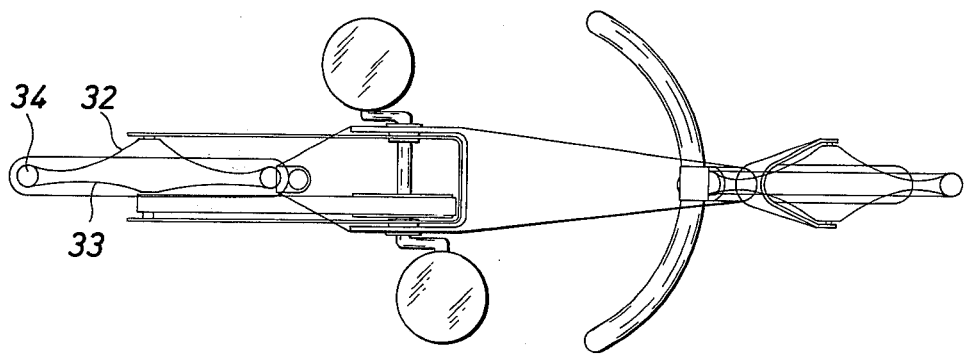

The invention will be described below with reference to the accompanying drawing, in which FIG. 1 shows a bicycle according to the invention in side view and partly in cross-section, and FIG. 2 the same as FIG. 1 seen from the top.

The bicycle has an angular frame portion which may be manufactured by pressure moulding of a plastics material, e.g. reinforced by glass fibres, and shaped as a hollow body. From the crank 2 in which the crank shaft is mounted in bearings fixed in the frame a frame portion 3 extends obliquely upwardly and rearwardly, and a further frame portion 4 extends obliquely upwardly and forwardly. The frame portion 4 carries a front fork tube 5 which extends substantially parallel to the frame portion 3.

A rear fork 6 may consist of steel plates which are rotatably mounted in the frame about the axis of the crank, and the fork has a forwardly extending portion 7 which is embedded in a body 8 of elastic material, e.g. an elastic plastics material or a rubber material, which is mounted in a bead 9 on a wall 10 of the frame and follows the periphery of the crank. Thereby the rear fork will be resilient and can carry out small oscillations about the axis of the crank.

The rear fork 6 carries a rear wheel 11 with a sprocket wheel on which a rather broad band of a rubber material is arranged. The band 12 connects the sprocket wheel with a sprocket wheel 13 on the crank shaft.

In the frame portion 3 a steel tube 14 is mounted, in which a tube 15 carrying the saddle 16 is adjustably mounted. In the tube 15 a series of recesses 17 is provided, in which a wing screw 18 which is screwed into a pipe stub 19 on the frame portion 3 can be inserted. Thereby the position of the saddle can be adjusted stepwise.

In the tubular frame member 5 a tube 21 connected to the front fork 20 is mounted, said tube 21 being mounting tube for the steering member tube 25. Between the front fork and the mounting tube 21 an annular member 23 of elastic material, such as an elastic plastic or rubber, is mounted. Thereby the front fork is resiliently mounted.

The mounting tube 21 is arched and follows a part of a circle having its centre in front of the frame when the front wheel 24 is in position for straight ahead driving. In the mounting tube 21 is mounted the correspondingly arched sheering member tube 25 which has recesses 17 corresponding to the recesses 17 in the tube 15 and a fixing screw 18 corresponding to the screw 18 in the frame portion 3.

It appears from FIG. 1 that a lifting of the steering member as shown by the stippled line 26 and a lifting of the saddle 16 as shown by the stippled line 27 will have the effect that the horizontal distance between the saddle and the handlebars will increase.

Experiments have shown that a particularly good driving comfort is obtained if the angle $a$ between the axis of the tube 14 and a horizontal line 28 through the saddle and the handlebars is approximately 73°, and the angle $b$ between the line 28 and a line 29 between the crank and a point 30 on the handlebars corresponding to the position of the handles is approximately 62°. The angle between the axis of the tube 14 and the axis 31 of the frame portion 4 may suitably be 90°.

The wheels 11 and 24 can each be manufactured of two shells 32 and 33, e.g. of plastics material, which are welded together and carries a tyre 34 consisting of an elastic material, e.g. a plastics material or a rubber material, in which a screw spring of steel is embedded. Thereby a sufficient hardness for a good driving comfort with small wheels can be obtained.

I claim:

1. A bicycle comprising a frame portion extending obliquely from a crank and carrying a tube in which a saddle mounting tube is adjustably mounted by means of tightening means, so that the saddle can be fixed at a desired height, the frame further having an oblique front fork tube in which a mounting tube for a steering member tube tube is adjustably mounted, said mounting tube extending upwardly from the frame portion which receives the front fork tube and being arched in such a way that the centre is positioned in front of the frame when the front wheel is in position for straight ahead driving, a steering member tube arched in the same way as the mounting tube and slidably mounted in the mounting tube, and tightening means for fixing the two arched tubes in relation to each other.

2. A bicycle according to claim 1 wherein the tightening means for the steering member tube and the saddle mounting tube include wing screws which are each mounted in a pipe stub on the said mounting tube, the screw being adapted to be received in recesses in the steering member tube and the saddle tube, respectively.

3. A bicycle according to claim 1 including a saddle carried by the saddle mounting tube and handlebars carried by the steering member tube, wherein the frame, the steering member tube, and the mounting tube are so shaped that a substantially horizontal line through the saddle and the handlebars, a straight line from the crank through the saddle mounting tube, and a straight line from the crank to the handles in each position of the handlebars and the saddle constitute a triangle in which the angle at the saddle will be approximately 73° and the angle at the handlebars approximately 62°.

* * * * *